United States Patent [19]

Swager

[11] 4,068,960
[45] Jan. 17, 1978

[54] SAFETY LOCK FOR A REMOVABLE SHAFT

[76] Inventor: William E. Swager, P.O. Box 656, Fremont, Ind. 46737

[21] Appl. No.: 724,264

[22] Filed: Sept. 17, 1976

[51] Int. Cl.² ............................................. B25G 3/00
[52] U.S. Cl. .................................... 403/20; 403/324; 59/86
[58] Field of Search ............... 403/324, 157, 316, 317, 403/315, 327, 20, 325; 59/85, 86; 174/207

[56] References Cited

U.S. PATENT DOCUMENTS

| 520,110 | 5/1894 | Hull | 59/86 X |
|---|---|---|---|
| 2,097,465 | 11/1937 | Morrison | 59/86 X |
| 2,515,807 | 7/1950 | Spooner | 403/327 |
| 3,185,494 | 5/1965 | Dziedzic et al. | 403/321 |
| 3,309,864 | 3/1967 | Arndt et al. | 59/85 |
| 3,544,140 | 12/1970 | Langheck | 403/321 |

FOREIGN PATENT DOCUMENTS

| 677,560 | 1952 | United Kingdom | 403/317 |
|---|---|---|---|
| 750,734 | 1954 | United Kingdom | 59/86 |

Primary Examiner—Wayne L. Shedd

[57] ABSTRACT

The invention disclosed is a safety lock for a removable shaft which has special utility when disposed on a clevis or like device. The lockable shaft is disposed by means which readily permit free lateral movement while preventing accidental disengagement under load bearing conditions when in the locked position. In an embodiment, shaft removal from a cooperating support member is prevented by a shaft restrictive means. Thus, complete removal of the shaft from support members during load transfer is avoided.

7 Claims, 9 Drawing Figures

U.S. Patent      Jan. 17, 1978      4,068,960
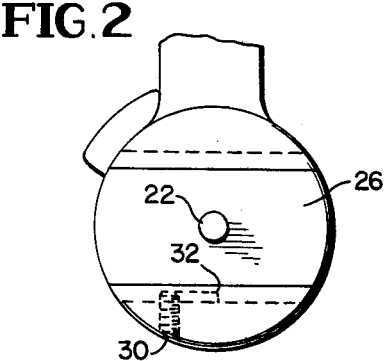
FIG. 2
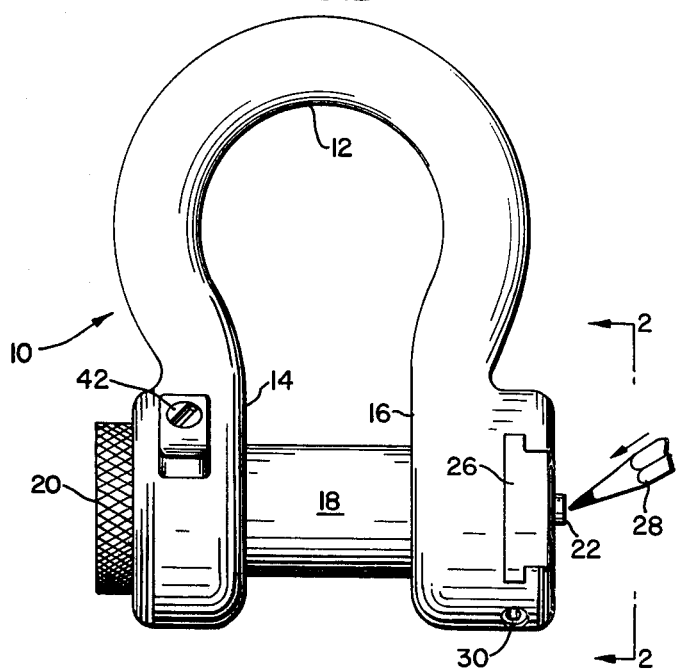
FIG. 1
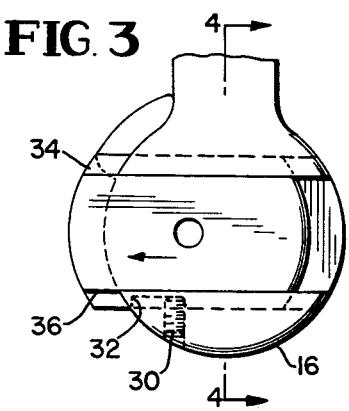
FIG. 3
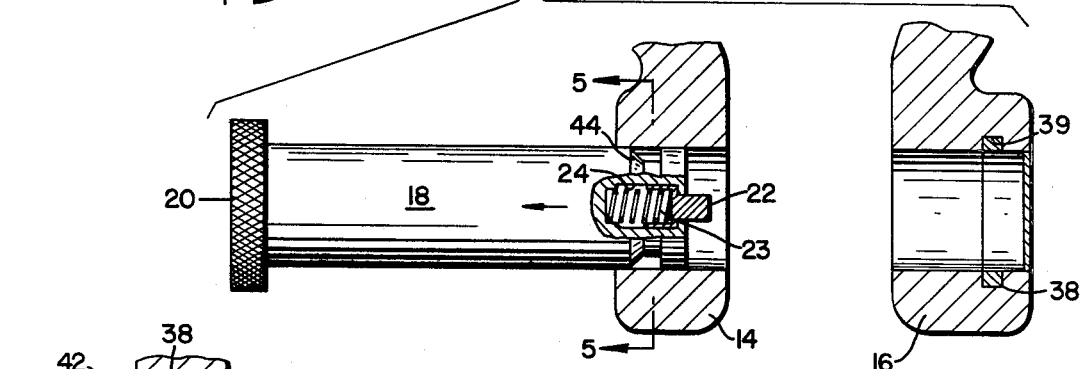
FIG. 4
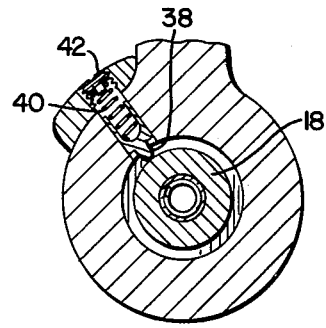
FIG. 5
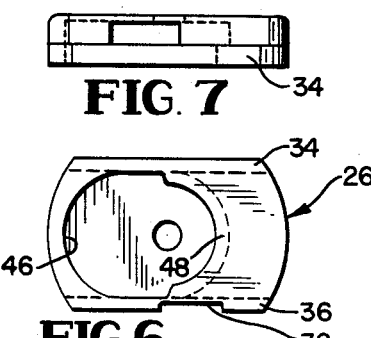
FIG. 6
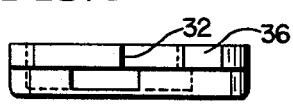
FIG. 7
FIG. 8
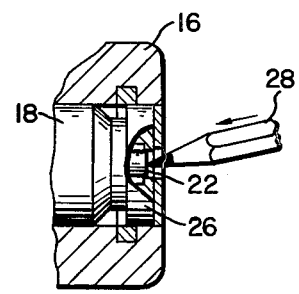
FIG. 9

SAFETY LOCK FOR A REMOVABLE SHAFT

The present invention relates to a new improved shaft locking means which readily permits lateral movement by users during load transfer. In an embodiment of the present invention, means are provided which restrict complete removal of the shaft in the un-locked position.

Numerous devices have been developed in the prior art for preventing accidental movement and disengagement of a bearing load shaft assembly. In one general type, the shaft is simply held in position by a pin or clamp which often becomes lost in usage. In another general type, shaft locking means have been complex and uneconomical to manufacture or otherwise are overly bulky and undesirable in use.

It has now been found that by practice of the present invention, there is provided a relatively simple, economical and safe locking means for a load bearing shaft.

Generally stated, the present shaft locking means comprises in combination, a shaft having an axially disposed spring biased pin projecting thereform, a rim disposed along the edge of the shaft about the spring biased pin, and a slidable rim engaging member having a slot therein for receiving the spring biased pin when in locked position. The slidable rim engaging member is disposed along an edge of a shaft support into which the shaft engages for load bearing condition.

In an embodiment of the present invention, a spring biased shaft engaging pin is disposed in a cooperating shaft support member such that engagement with the rim of the shaft during removal of the shaft prevents total disengagement of the shaft and the support members.

Although the present invention generally provides a locking means for a shaft configurated to support a load, it will for convenience be described herein with reference to a clevis for which it has special usage. Also, it will be appreciated that although the shaft is cylindrical herein for descriptive purposes, it may nevertheless be configurated with any multi-surface configuration having three or more sides as desired.

Practice of the present invention will become more readily apparent by reference to the drawing wherein:

FIG. 1 is a front elevational view of a clevis having the safety locking means of the present invention disposed about a removable shaft;

FIG. 2 is an end view of the safety locking means of the present invention, in normal position, taken as a partial view of the clevis of FIG. 1;

FIG. 3 is a similar view to FIG. 2 except illustrating a rim engaging member in un-locking position about the shaft;

FIG. 4 is a sectional view taken along lines 4—4 of FIG. 3 with the shaft in un-locked position;

FIG. 5 is a sectional view taken along lines 5—5 of FIG. 4 with the shaft restraining pin being illustrated;

FIG. 6 is a front elevational view of the rim engaging member for the shaft;

FIG. 7 is a top view of the rim engaging member of FIG. 6;

FIG. 8 is a bottom view of the rim engaging member of FIG. 6; and

FIG. 9 illustrates in partial broken view how the rim engaging member may be unlocked.

Referring to the figures wherein similar elements are referred by like numerals throughout the several views, FIG. 1 illustrates clevis 10 having a metal U-shaped shackle 12, the ends 14 and 16 of which are drilled to receive shaft 18. One end of shaft 18 has a knurled ridge 20 to permit easily engagement for removal whereas the opposite side thereof includes a spring biased axially disposed pin 22 which is projectable into a slot 24, FIGS. 2–3, provided on slidable rim engaging member 26. Projection of the spring biased axially disposed pin 22 from shaft 18 into slot 24 effectively locks the slidable rim engaging member 26 in locking position. By depressing pin 22 supported by spring 23, FIG. 4, by any convenient means such as pencil 28 out of slot engagement, sliding movement of the rim engaging member 26 may be readily effected. Disengagement of the pin 22 is more readily illustrated in FIG. 9.

FIGS. 2 and 3 respectively illustrate the rim engaging member 26 in locking and un-locking positions. Conveniently, the lateral movement of member 26 is restricted by slug screw 30 disposed in the body of support 16 for engagement of recess 32 on the inner base of member 26. Lateral movement of member 26 along the outer surface of support 16 may be within any convenient channel as desired. For illustration purposes, member 26 includes an upper projecting track 34 and a lower projecting track 36 for movement within channel slots 39 disposed within the body of the support 16. If desired movement of member 26 may be spring biased to the locking position by any convenient means not shown.

FIG. 4 illustrates shaft 18 in the unlocked position and removed of support 16. Complete removal of the shaft from support 14 may be restricted by a shaft engaging pin or detent 38 illustrated in FIG. 5.

FIG. 5 shows shaft engaging pin 38 spring biased by spring 40 and held in position by screw 42 within the body of support 14. By providing a taper 44, FIG. 4, to the surface of a channel about shaft 18 opposite the rim edge, pin 38 can easily be removed of contact with the inner surface of the rim while the shaft is moved into engaging position with support member 16. Simply, the pin 38 is caused to ride up the taper surface when the shaft is closed into member 16.

FIGS. 6–8 illustrate the configuration of the lateral sliding rim engaging member 26. The inner surface of member 26, opposite the surface having the slot disposed therein, has a cut-out 46 larger than the outer peripheral size of the rim portion 26 of the shaft, the cut-out 46 favoring one edge of member 22. By having the cut-out 46 slightly larger, engagement and disengagement of the rim 26 is readily effected. Cut-out 46 is, however, restricted on side portion thereof such that a rim engaging flange 48 is available for engaging up to half of the circumference of the rim 26. Thus, when the rim portion of the shaft is in the unrestricted portion of cut-out 46, it is free of engagement and may be readily moved axially whereas when it is within the restricted portion 48, axial movement of the shaft is restricted and the shaft is effectively locked in position. Should it be desired to move the locked shaft, the axial pin is depressed as illustrated in FIG. 9 and the member 26 moved laterally.

Although a preferred embodiment has been described herein, it will be readily appreciated that numerous changes and variations will become readily apparent to those skilled in the art. Accordingly, variations and modifications in the practice of the present invention are contemplated within the scope of the present invention which is limited only by the claims.

What is claimed is:

1. A shaft locking means comprising in combination, a shaft having an axially disposed spring biased pin projecting therefrom, a rim disposed along the edge of the shaft about the spring biased pin, a shaft support member having means to receive the shaft, and a slidable rim engaging member having a slot therein for receiving the spring biased pin, said slidable rim engaging member being disposed within the body portion of the support member.

2. The shaft locking means of claim 1 disposed along one support leg of a shackle forming a clevis.

3. The shaft locking means of claim 2, wherein a second leg of the shackle has a spring biased shaft engaging pin disposed therein, the shaft having a tapered surface from a channel from which the rim is configurated.

4. The shaft locking means of claim 1, wherein the slidable rim engaging member has a cut-out portion along the inner wall thereof, a portion of said cut-out having a size sufficient to receive the rim of the shaft, and a second portion of said cut-out having a restricted size sufficient to engage and restrict up to half the circumference of the rim.

5. The shaft locking means of claim 1, wherein the shaft has a knurled surface along the edge opposite the edge having the spring biased pin.

6. The shaft locking means of claim 1, wherein the slidable rim engaging member has restricted lateral movement within the body of the support member.

7. A lockable axially slidable shaft having a circumferential groove at one end forming a collar, a spring biased locking pin projecting axially from said shaft, a ring slidably supporting said shaft in axial movement and a radially slidable rim-engaging member on said ring radially sliding over the end of said shaft and engaging said collar and locking said shaft against axial movement in said ring, said rim-engaging member being bored through its surface to receive said locking pin and locking said rim-engaging member against radial movement in locked position upon said collar and shaft.

* * * * *